(12) United States Patent
Chang

(10) Patent No.: US 7,163,581 B2
(45) Date of Patent: Jan. 16, 2007

(54) METHOD FOR MAKING REGENERATED SOIL MATERIAL FOR THE PRODUCTION OF A STRUCTURAL UNIT, THE STRUCTURAL UNIT MADE FROM THE REGENERATED SOIL MATERIAL, AND METHOD FOR RECYCLING THE STRUCTURAL UNIT

(75) Inventor: Cheng-Feng Chang, Kaohsiung Hsien (TW)

(73) Assignee: Cheng-Mao Chang, Kaohsiung Hsien (TW)

( * ) Notice: Subject to any disclaimer, the term of this patent is extended or adjusted under 35 U.S.C. 154(b) by 0 days.

(21) Appl. No.: 11/064,799

(22) Filed: Feb. 23, 2005

(65) Prior Publication Data

US 2006/0185559 A1 Aug. 24, 2006

(51) Int. Cl.
  C04B 28/26 (2006.01)
  C04B 18/16 (2006.01)
  E04B 1/16 (2006.01)
  B28B 3/00 (2006.01)
(52) U.S. Cl. ..................... 106/624; 106/632; 106/633; 52/745.19; 264/333; 264/915

(58) Field of Classification Search ................ 106/624, 106/632, 633; 264/333, 915; 52/745.19
See application file for complete search history.

(56) References Cited

U.S. PATENT DOCUMENTS

| 4,229,222 | A | * | 10/1980 | Schneider | .................... 106/618 |
| 4,328,035 | A | * | 5/1982 | Ingles et al. | ................. 106/624 |
| 5,431,728 | A | * | 7/1995 | Frouin et al. | ................ 106/612 |
| 5,601,643 | A | * | 2/1997 | Silverstrim et al. | ......... 106/624 |
| 7,069,677 | B1 | * | 7/2006 | Chang | ......................... 37/466 |

* cited by examiner

*Primary Examiner*—David M. Brunsman
(74) *Attorney, Agent, or Firm*—Allston L. Jones

(57) ABSTRACT

A method for making a regenerated soil material for the production of a structural unit includes the steps of: a) obtaining a raw soil material containing aluminum and silicon from a natural source; b) adding an active mineral containing aluminum and silicon to the raw soil material; c) cleaving the raw soil material and the active mineral in a base so as to dissociate aluminum monomer and silicon monomer out of the mixture of the raw soil material and the active mineral; and d) polymerizing the aluminum monomer and the silicon monomer so as to form silicon-oxy tetrahedron and aluminum-oxy tetrahedron in the mixture.

5 Claims, 2 Drawing Sheets

METHOD FOR MAKING REGENERATED SOIL MATERIAL FOR THE PRODUCTION OF A STRUCTURAL UNIT, THE STRUCTURAL UNIT MADE FROM THE REGENERATED SOIL MATERIAL, AND METHOD FOR RECYCLING THE STRUCTURAL UNIT

BACKGROUND OF THE INVENTION

1. Field of the Invention

The invention relates to a process for making a regenerated soil material, particularly to a process for making a regenerated soil material for the production of a structural unit, such as a wave-breaking block and the like. This invention also relates to the structural unit made from the regenerated soil material, and to a method for recycling the structural unit.

2. Description of the Related Art

Structural units, such as wave-breaking blocks and the like, are disposed at shores or river banks for flood protection. Conventional structural units are usually made by using a substantial amount of cement and sand as cementing material. However, the use of a substantial amount of cement and sand can arise in the following disadvantages:

1. A large amount of carbon dioxide is produced during the cement manufacture, which results in an environmental problem.

2. The sand used for the conventional structural units is usually obtained from a riverbed. Therefore, environmental damage is likely due to the over-exploitation of the riverbed for obtaining stones for making the sand.

3. The conventional structural unit is a concrete structure impermeable to water, and is usually different from the shore in color. Therefore, the view of the shore can be affected adversely.

4. The conventional structural unit made by blending sand with cement cannot be recycled or decomposed naturally. Therefore, when the conventional structural unit is discarded, it can cause permanent pollution to the environment.

Another conventional structural unit is made by using soil and cement as raw materials. The method for producing this conventional structural unit includes blending soil with cement into a mixture, and compacting the mixture by rolling to form the structural unit having a required density and strength. Although this conventional structural unit can be made without using sand, the production thereof is relatively complicated. Additionally, the compressive strength of the structural unit made from the soil and cement mixture is in a order below 10 MPa (mega-pascal), which is insufficient for practical use. Although the structural unit is made using soil as a primary material, the grains of the soil can bond to the cement after compacting, which in turn causes the structural unit to be impermeable to water.

SUMMARY OF THE INVENTION

Therefore, the object of the present invention is to provide a method for making a regenerated soil material for production of a structural unit, which has sufficient strength for practical use, which is water permeable, and which can be recycled.

In the first aspect of this invention, a method for making a regenerated soil material for the production of a structural unit includes the steps of:

a) obtaining a raw soil material containing aluminum and silicon from a natural source;

b) adding an active mineral containing aluminum and silicon to the raw soil material;

c) cleaving the raw soil material and the active mineral in a base so as to dissociate aluminum monomer and silicon monomer out of the mixture of the raw soil material and the active mineral; and d) polymerizing the aluminum monomer and the silicon monomer so as to form silicon-oxy tetrahedron and aluminum-oxy tetrahedron in the mixture.

In the second aspect of this invention, a structural unit includes the regenerated soil material made by the aforesaid method.

In the third aspect of this invention, a method for recycling the structural unit includes the steps of:

a) breaking and milling the structural unit to form a recycled soil material;

b) adding an active mineral containing aluminum and silicon to the recycled soil material;

c) cleaving the recycled soil material and the active mineral in a base so as to dissociate aluminum monomer and silicon monomer out of the mixture of the recycled soil material and the active mineral; and d) polymerizing the aluminum monomer and the silicon monomer so as to form silicon-oxy tetrahedron and aluminum-oxy tetrahedron in the mixture.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
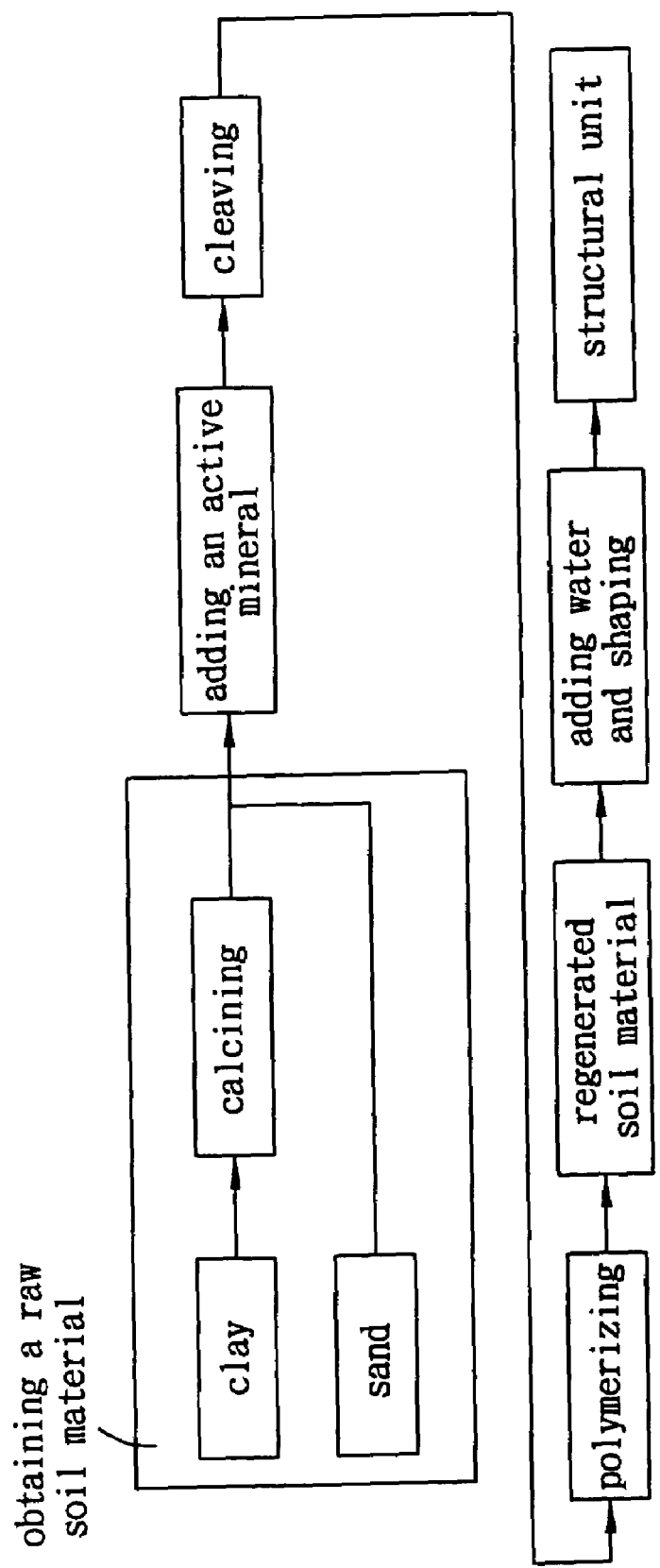
FIG. 1 is a flow diagram of the preferred embodiment of a method for making a regenerated soil material for the production of a structural unit according to this invention.

Referring to FIG. 1, the preferred embodiment of the method for making a regenerated soil material for the production of a structural unit includes the steps of:

A) Obtaining a Raw Soil Material

A raw soil material containing aluminum and silicon is obtained from a natural source. When the raw soil material includes clay, it is required to calcine the clay at an elevated temperature so as to break hydrogen bonds of the compound, such as aluminum hydroxide, contained in the clay, and so as to form metastable amorphous aluminum compounds and silicon compounds in the raw soil material. When the raw soil material includes sand, which contains no hydrogen bonds, the raw soil material can be used for the subsequent processing directly.

B) Adding an Active Mineral

An active mineral containing aluminum and silicon is added to the raw soil material in a suitable amount depending on the amounts of aluminum and silicon contained in the raw soil material so as to supplement the amounts of aluminum and silicon contained in the raw soil material.

C) Cleaving

The raw soil material and the active mineral are cleaved in a base so as to dissociate aluminum monomer and silicon monomer out of the mixture of the raw soil material and the active mineral.

D) Polymerizing

The aluminum monomer and the silicon monomer are polymerized so as to make the regenerated soil material formed with silicon-oxy tetrahedron and aluminum-oxy tetrahedron in the mixture.

The regenerated soil material can be further processed by adding a proper amount of water thereto to form a slurry, and shaping the slurry in a mold to form the structural unit, such as a wave-breaking block, a slope protector, a stone material, a building structure, a grip structure, and the like.

Figure 2:
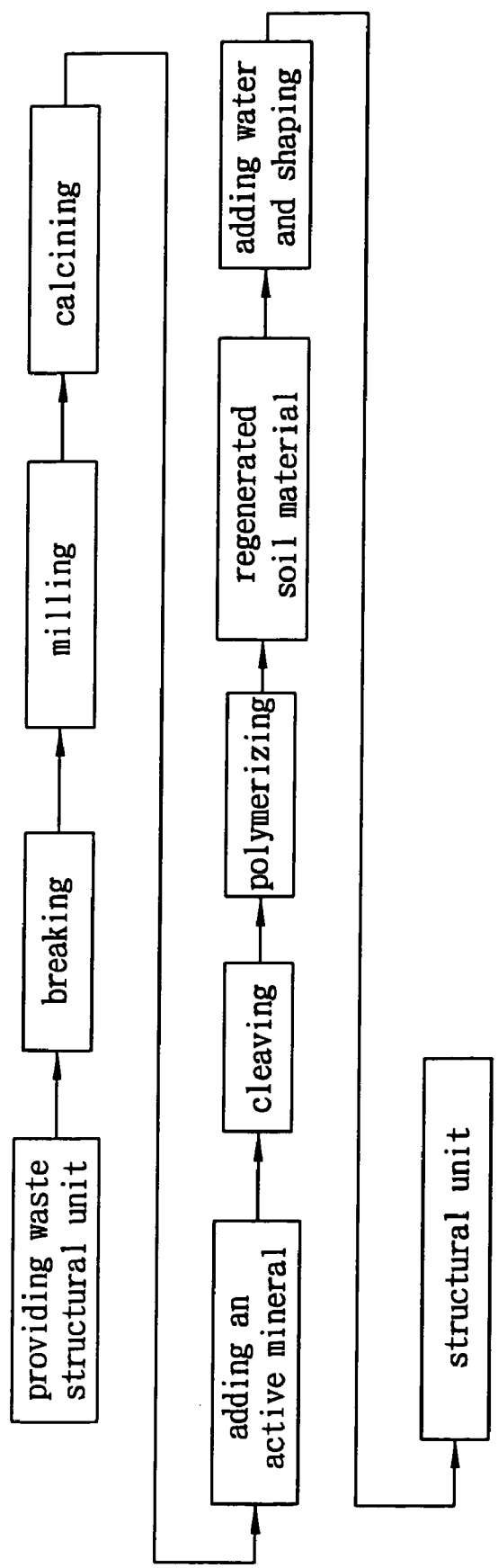
FIG. 2 is a flow diagram of the preferred embodiment of a method for recycling a structural unit according to this invention.

Referring to FIG. 2, the preferred embodiment of a method for recycling the structural unit according to this invention includes the steps of:

1) Breaking and Milling

The structural unit made from the aforementioned regenerated soil material is broken and milled to form a recycled soil material.

2) Adding an Active Mineral

The active mineral containing aluminum and silicon is added to the recycled soil material in a suitable amount depending on the amounts of aluminum and silicon contained in the recycled soil material so as to supplement the amounts of aluminum and silicon contained in the recycled soil material.

3) Cleaving

The recycled soil material and the active mineral are cleaved in a base so as to dissociate aluminum monomer and silicon monomer out of the mixture of the recycled soil material and the active mineral.

4) Polymerizing

The aluminum monomer and the silicon monomer are polymerized so as to make the regenerated soil material formed with silicon-oxy tetrahedron and aluminum-oxy tetrahedron in the mixture.

As described above, the regenerated soil material can be further processed to form the structural unit.

The raw soil material suitable in this invention can be classified according to ASTM D2487 into a gravelly soil (GW, GP, GM, GC, GC-GM, GW-GM, GW-GC, GP-GM, and GP-GC) , a sandy soil (SW, SP, SM, SC, SC-SM, SW-SM, SW-SC, SP-SM, SP-SC), a powdery soil, and a clay soil (GL, ML, OL, CH, MH, OH, CL-ML, Pt). G stands for gravelly soil, O stands for organic clay, Pt stands for peat, W stands for a well-graded soil, P stands for a poorly-graded soil, L stands for low plasticity, and H stands for high plasticity.

The raw soil material obtained for this invention is first classified prior to further processing. As described above, when the raw soil material, such as clay, contains hydrogen bonds therein, it is required to calcine the raw soil material at an elevated temperature so as to break hydrogen bonds of the compound, such as aluminum hydroxide, contained in the raw soil material. If the hydrogen bonds contained in the raw soil material are not broken, the structural unit made therefrom may have a compressive strength insufficient for practical use. Furthermore, since a great amount of water may be absorbed due to the hydrogen bonds during the manufacture of the structural unit, the structural unit product may shrink and crack upon drying. Preferably, the raw soil material containing hydrogen bonds is calcined at 700° C. for 4 hours so as to break the hydrogen bonds of the compound, such as aluminum hydroxide, contained in the raw soil material, and to form metastable amorphous aluminum compounds and silicon compounds in the raw soil material.

The active mineral used in this invention is a mineral containing a relatively large amount of silicon dioxide and aluminum oxide. Examples of the active mineral suitable for use in this invention include fly ash, slag powder, zeolite powder, silica fume, and combinations thereof.

The raw soil material and the active mineral are cleaved by adding a sodium hydroxide solution having a concentration ranging from 5 to 10 M to the mixture so as to dissociate aluminum monomer and silicon monomer out of the mixture of the raw soil material and the active mineral.

The polymerizing step is then conducted by adding to the mixture of the raw soil material and the active mineral a polymerizing medium, such as sodium silicate or potassium silicate, so as to make the regenerated soil material formed with silicon-oxy tetrahedron and aluminum-oxy tetrahedron in the mixture. The tetrahedrons are bonded to each other via ionic bonds and covalent bonds primarily and via van der Waals bonds secondarily. Since the bonding of the tetrahedrons is similar to that of metal, a superior structural strength can be obtained thereby for the regenerated soil material. According to the atomic ratio of silicon to aluminum contained in the raw soil material, the tetrahedron structure formed in the regenerated soil material can be classified into the following four types:

(i): if Si:Al=1 (i.e., —Si—O—Al—), the tetrahedron structure is:

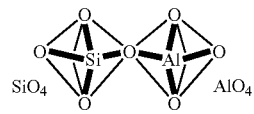

(ii): if Si:Al=2 (i.e., —Si—O—Al—O—Si—), the tetrahedron structure is:

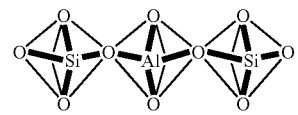

(iii): if Si:Al=3 (i.e., —Si—O—Al—O—Si—O—Si—), the tetrahedron structure is:

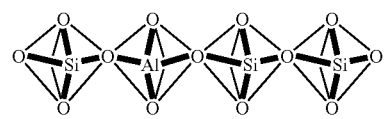

(iv): if Si:Al>3, the tetrahedron structure is:

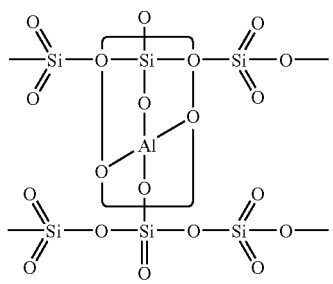

As described above, the regenerated soil material can be further processed by adding a proper amount of water thereto to form a slurry, then shaping the slurry by, for example, casting in a mold to form the structural unit, such as a wave-breaking block, a slope protector, a stone material, a building structure, a grip structure, and the like. According to test results, a preferred composition of the slurry for making the structural unit having superior compressive strength and water permeability includes 25–50 wt % of the soil, 25–50 wt % of the active mineral, 20–35 wt % water, 5–10 wt % of the polymerizing medium, and a minor amount of water.

The structural unit of this invention can be recycled after a period of use so as to reproduce the regenerated soil material. The structural unit is first broken and milled by using a ball mill having milling balls of diameter ranging from 50 to 80 mm to form a recycled soil material having a particle size less than 0.2 mm. The recycled soil material is then added with the active mineral, cleaved, and polymerized as described above so as to reproduce the regenerated soil material.

The following examples further illustrate the preferred embodiments of the invention, but are not to be construed as limiting.

EXAMPLES

Example 1

Following the procedure shown in FIG. 1, 1000 parts by weight of fly ash was added to 1000 parts by weight of calcined raw soil material to obtain a mixture. The mixture was cleaved by using 50 parts by weight of 10 M sodium hydroxide solution, and was subsequently polymerized by using 120 parts by weight of sodium silicate to obtain a regenerated soil material. Thereafter, 900 parts by weight of water was added to the regenerated soil material to obtain a slurry, which was then cast in a mold to form a structural unit, such as a wave-breaking block, a slope protector, a stone material, a building structure, a grip structure, and the like. The components and the amounts thereof used in Example 1 are shown in Table 1. The compositions of the fly ash and the soil material are shown in Table 2. Sodium silicate was produced by contacting 14.7% $Na_2O$ with 29.5% $SiO_2$ in 55.8% water. Measured compressive strength, porosity, and permeability coefficient of the structural unit are shown in Table 3.

Examples 2–10

The procedure of Example 1 was repeated using the components and the amounts thereof shown in Table 1. The raw soil material used in Examples 9 and 10 mainly included sand, which contains no hydrogen bonds, and which does not need to undergo calcination. The raw soil material used Examples 3–8 included both calcined soil and sand. Measured compressive strength, porosity, and permeability coefficient of the structural units are shown in Table 3.

TABLE 1 components and amounts thereof used in the examples

| Ex. # | Calcined soil | Calcined recycled soil | Fly ash | Slag powder | Sand | Water | NaOH (10M) | $Na_2SiO_3$ |
|---|---|---|---|---|---|---|---|---|
| 1 | 1000 | 0 | 1000 | 0 | 0 | 900 | 50 | 120 |
| 2 | 1000 | 0 | 0 | 1000 | 0 | 850 | 50 | 120 |
| 3 | 700 | 0 | 700 | 0 | 600 | 450 | 50 | 120 |
| 4 | 700 | 0 | 0 | 700 | 600 | 400 | 50 | 120 |
| 5 | 500 | 0 | 700 | 0 | 800 | 400 | 50 | 120 |
| 6 | 500 | 0 | 0 | 700 | 800 | 380 | 50 | 120 |
| 7 | 200 | 0 | 700 | 0 | 1100 | 300 | 50 | 120 |
| 8 | 200 | 0 | 0 | 700 | 1100 | 350 | 50 | 120 |
| 9 | 0 | 0 | 700 | 0 | 1300 | 200 | 50 | 120 |
| 10 | 0 | 0 | 0 | 700 | 1300 | 200 | 50 | 120 |
| 11 | 0 | 1000 | 1000 | 0 | 0 | 900 | 50 | 120 |
| 12 | 0 | 1000 | 0 | 1000 | 0 | 850 | 50 | 120 |
| 13 | 0 | 700 | 700 | 0 | 600 | 450 | 50 | 120 |
| 14 | 0 | 700 | 0 | 700 | 600 | 400 | 50 | 120 |
| 15 | 0 | 500 | 700 | 0 | 800 | 400 | 50 | 120 |
| 16 | 0 | 500 | 0 | 700 | 800 | 380 | 50 | 120 |

TABLE 2

Compositions of soil, fly ash, and slag powder

| materials | Weight Percentage (wt %) | | | | | | | |
|---|---|---|---|---|---|---|---|---|
| | $SiO_2$ | $Al_2O_3$ | $Fe_2O_3$ | CaO | MgO | $Na_2O + K_2O$ | $TiO_2$ | LOI* |
| Soil | 59.32 | 14.17 | 5.94 | 1.18 | 1.68 | 4.14 | 0.79 | 12.61 |
| Calcined Soil | 59.88 | 15.25 | 5.34 | 1.13 | 1.14 | 3.85 | 0.77 | 12.64 |
| Fly ash | 52.36 | 26.49 | 11.86 | 1.34 | 0.87 | 1.27 | 2.47 | 3.31 |
| Slag powder | 34.12 | 15.93 | 0.92 | 35.94 | 8.92 | 0.73 | 2.72 | 0.14 |
| Recycled soil | 58.32 | 20.17 | 0.78 | 7.15 | 0.68 | 8.14 | 0.79 | 3.61 |
| Calcined recycled soil | 59.11 | 21.32 | 0.33 | 7.14 | 0.58 | 8.12 | 0.79 | 2.61 |

*LOI: Lost on ignition

TABLE 3

Test result for examples

| Ex. # | Compressive strength (MPa) | | | Porosity (%) | Permeability coefficient (m/sec) |
|---|---|---|---|---|---|
| | 7 days | 28 days | 90 days | 90 days | 90 days |
| 1 | 15.3 | 20.7 | 20.8 | 41.2 | $2.1 \times 10^{-6}$ |
| 2 | 15.6 | 20.8 | 20.9 | 39.6 | $1.7 \times 10^{-6}$ |
| 3 | 16.2 | 21.6 | 21.9 | 37.5 | $2.4 \times 10^{-6}$ |
| 4 | 20.4 | 25.5 | 26.1 | 36.6 | $3.6 \times 10^{-6}$ |
| 5 | 20.7 | 25.8 | 26.1 | 37.3 | $9.8 \times 10^{-5}$ |
| 6 | 22.3 | 27.9 | 28.3 | 36.5 | $9.2 \times 10^{-5}$ |
| 7 | 21.3 | 26.4 | 27.0 | 32.9 | $3.4 \times 10^{-6}$ |
| 8 | 25.3 | 29.3 | 29.6 | 34.3 | $4.7 \times 10^{-6}$ |
| 9 | 27.2 | 27.6 | 27.6 | 33.1 | $7.8 \times 10^{-5}$ |
| 10 | 30.3 | 31.2 | 32.4 | 29.1 | $8.8 \times 10^{-5}$ |
| 11 | 20.1 | 25.1 | 25.3 | 35.3 | $3.3 \times 10^{-6}$ |
| 12 | 22.3 | 27.7 | 27.9 | 34.8 | $2.5 \times 10^{-6}$ |
| 13 | 24.8 | 30.9 | 31.1 | 36.3 | $4.5 \times 10^{-6}$ |
| 14 | 25.5 | 32.1 | 32.1 | 33.3 | $1.7 \times 10^{-6}$ |
| 15 | 26.7 | 34.1 | 34.7 | 32.8 | $8.9 \times 10^{-5}$ |
| 16 | 28.3 | 36.9 | 37.2 | 33.2 | $9.2 \times 10^{-5}$ |

Example 11

Following the procedure shown in FIG. 2, a structural unit to be recycled was broken and milled by using a ball mill having milling balls of diameter ranging from 50 to 80 mm to form a recycled soil material having a particle size less than 0.2 mm. The recycled soil material was calcined to obtain a calcined recycled soil material. 1000 parts by weight of fly ash was added to 1000 parts by weight of the calcined recycled soil material to obtain a mixture. The mixture was cleaved by using 50 parts by weight of 10 M sodium hydroxide solution, and was then polymerized by using 120 parts by weight of sodium silicate to obtain a regenerated soil material. Thereafter, 900 parts by weight of water was added to the regenerated soil material to obtain a slurry, which was subsequently cast in a mold to form a structural unit, such as a wave-breaking block, a slope protector, a stone material, a building structure, a grip structure, and the like. The components and the amounts thereof used in Example 11 are shown in Table 1. The compositions of the fly ash and the soil material are shown in Table 2. Measured compressive strength, porosity, and permeability coefficient of the structural unit are shown in Table 3.

Examples 12–16

The procedure of Example 11 was repeated using the components and the amounts thereof shown in Table 1. The raw soil material used Examples 13–16 included both calcined recycled soil material and sand. Measured compressive strength, porosity, and permeability coefficient of the structural units are shown in Table 3.

As shown in Table 3, for all of the structural units of the examples, the compressive strength after 28 days is above 20 MPa, the compressive strength after 90 days is comparable to that after 28 days, and the compressive strength after 7 days is 70–80% of that after 28 days. The compressive strengths of all of the structural units of the examples are above the values required for practical use. For example, the 28-day compressive strength required for the wave-breaking block should be above 17.16–20.6 MPa. Specifically, the raw soil material used in Examples 9 and 10 mainly included sand, which can be used directly without calcining. The 28-day compressive strengths for the structural units of Examples 9 and 10 are above 20 MPa. In Examples 11–16, in which the recycled soil material is used, the compressive strengths are increased significantly.

The following Table 4 shows the permeability coefficients of the regenerated soil material of this invention and various conventional soil materials.

TABLE 4 permeability coefficients of the regenerated soil material of this invention and various conventional soil materials

| materials | Permeability coefficient (m/sec) |
|---|---|
| Clean gravel | $10^{-2}$~1 |
| Coarse sand | $10^{-2}$~$10^{-4}$ |
| Fine sand | $10^{-4}$~$10^{-5}$ |
| Powdery clay | $10^{-5}$~$10^{-7}$ |
| Clay | $<10^{-7}$ |
| Common concrete | $10^{-10}$~$10^{-11}$ |
| High performance concrete | $<10^{-11}$ |
| Regenerated soil material of this invention | $10^{-5}$~$10^{-7}$ |

As shown in Table 4, the permeability coefficient of the regenerated soil material of this invention is improved as compared to those of the conventional soil materials. Therefore, the aforesaid environmental problems suffered in the prior art can be avoided.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A method for making a regenerated soil material for the production of a structural unit, comprising the steps of:
   a) calcining a soil at an elevated temperature;
   b) adding an active mineral containing aluminum and silicon to the soil calcined in the step a), wherein the active mineral is selected from the group consisting of fly ash, slag powder, zeolite powder and silica fume;
   c) adding to the soil and the active mineral a sodium hydroxide solution having a concentration ranging from 5 to 10 M; and
   d) adding to the mixture of the soil, the active mineral, and the sodium hydroxide solution a polymerizing medium selected from the group consisting of sodium silicate and potassium silicate.

2. The method as claimed in claim 1, wherein the calcining step is conducted at a temperature of 700° C. for 4 hours.

3. A structural unit, comprising a regenerated soil material made by the steps of:
   a) calcining a soil at an elevated temperature;
   b) adding an active mineral containing aluminum and silicon to the soil calcined in the step a), wherein the active mineral is selected from the group consisting of fly ash, slag powder, zeolite powder and silica fume;
   c) adding to the soil and the active mineral a sodium hydroxide solution having a concentration ranging from 5 to 10 M; and d) adding to the mixture of the soil, the active mineral, and the sodium hydroxide solution a polymerizing medium selected from the group consisting of sodium silicate and potassium silicate.

4. A method for recycling the structural unit of claim 3, comprising the steps of:

a) breaking and milling the structural unit to form a recycled soil material;

b) calcining the recycled soil material at an elevated temperature;

c) adding an active mineral containing aluminum and silicon to the recycled soil material calcined in the step b), wherein the active mineral is selected from the group consisting of fly ash, slag powder, zeolite powder and silica fume;

d) adding to the recycled soil material and the active mineral a sodium hydroxide solution having a concentration ranging from 5 to 10 M; and e) adding to the mixture of the recycled soil material, the active mineral and the sodium hydroxide solution a polymerizing medium selected from the group consisting of sodium silicate and potassium silicate.

5. The method as claimed in claim 4, wherein the recycled soil material has a particle size less then 0.2 mm.

* * * * *